Patented Apr. 4, 1939

2,152,665

UNITED STATES PATENT OFFICE 2,152,665

OIL EXTRACTION

Henry Rosenthal, New York, N. Y.

Application August 4, 1934, Serial No. 738,400

15 Claims. (Cl. 87—6)

My invention relates to apparatus for and methods of extraction of soluble material from solid matter. It is particularly related to the extraction of fats and oils with low boiling hydrocarbon as a solvent maintained under pressure in an extractor of the batch type.

My invention provides a novel form of extractor; a novel method of and means for removing the solvent from the spent material, and extraction products of high quality.

Propane, butane, propylene, butylene and similar low boiling hydrocarbons are particularly well adapted to the extraction of oils and fats from oleaginous materials, as by proper manipulation with these materials as extracting media, products of high quality can be obtained. However, due to their combustible nature and the advisability of utilizing these solvents under pressure, an extractor of special form is essential when these solvents are used.

My present invention relates to an extractor suitable for use under pressure with low boiling hydrocarbon as solvents and to special means of treating both the solution obtained and the spent extracted material in such a manner that the products of the extraction will be of high quality.

While continuous counter-current extraction is theoretically the most efficient and is also practically so when large quantities of material are to be handled, it is not readily adapted for use with small through-puts of material. Moreover, the first cost of plant and continuous operation is in excess of that for batch operation. This invention is accordingly directed to batch extraction suitable for use where the continuous counter-current system is not commercially well adapted.

I have found that where the oil to be extracted has a specific gravity in excess of the solvent used, the more concentrated solution will tend to fall through the material so that for efficient operation when using a low gravity solvent such as the lower hydrocarbons, it is necessary to deliver the fresh solvent to the top of the extractor and remove the oily solution from the bottom of the extractor.

I further found that after the solids have been extracted by the solvent, the remaining meal holds an appreciable amount of solution by capillary attraction, absorption and entrainment. It is necessary to remove the solution from the spent meal for the purpose both of recovering the solvent and recovering the spent meal in suitable form. With such solvents as low boiling hydrocarbons, it is advantageous to remove this solvent from the spent meal prior to the discharge of the meal from the extractor. In this way any risk from fire is greatly reduced as solvent vapors are not discharged from the meal to the atmosphere when the latter is withdrawn from the extractor.

Furthermore, I have discovered that it is desirable to separate from the extracted meal as much solvent in the liquid form as may readily be so removed; and it is desirable that after the maximum amount of solvent has been removed from the meal as liquid, further amounts be removed as vapor at such pressure that the vapors can be condensed by the application of a minimum amount of compression. It is then necessary, as a further step, to effect substantially complete removal of the vapors to reduce the pressure of the vapor in contact with the meal after the solvent has been completely vaporized. It is also desirable that the temperature applied to the meal be limited in order to prevent deterioration of the meal.

My invention provides apparatus for and methods of accomplishing these results that will be more fully described.

The extraction of oil seeds and other materials require that these materials be reduced to a meal in order that the solvent can penetrate to the oil cells. The solution obtained thus often contains quantities of fine meal, some of which may be in a substantially colloidal condition. This suspended material often causes the desired product to deteriorate if left in the solution for any appreciable time. Furthermore, many of the oils are very viscous and difficult to filter when the solvent has been removed prior to the separation of the suspended material which is often of a mucous or gelatinous character. However, I have found that they are easily filtered in the solution. I, therefore, provide means of filtering the solution immediately upon its discharge from the extractor.

In the removal of the solvent from the solution by distillation, it is desirable that pressure be maintained to effect the recondensation of the solvent with a minimum of compression. In the preparation of an edible oil, it is essential that practically all traces of solvent be removed from the product. Even with such solvents as propane and butane, which are gases under normal temperature and atmospheric pressure, care is necessary in order that the final traces of solvent be eliminated, as the extraction of the oil from the solid depends upon the mutual solubility of the oil and the solvent, and this mutual solubility of the materials acts to prevent the ready removal of the solvent from the oily product. Furthermore, the application of high temperatures to effect this separation in many cases causes a deterioration of the oil as the high temperature tends to set undesirable color and to produce a dark colored oil. The proper handling of the solution will act to produce a product with desirable color characteristics.

Moreover, many oils upon distillation tend to produce froth or foam when the oily content of the solution becomes sufficiently concentrated. This is especially true when small amounts of water are present. This frothing or foaming, unless properly provided for, prevents proper separation and acts to cause contamination of the condensed solvent. My invention provides means and methods of efficiently separating the solvent and the product from the solution.

Accordingly the objects of my invention are thus:
1. To provide an efficient extractor.
2. To provide an extractor for use at other than atmospheric pressure.
3. To provide an efficient means for and method of removing solvent from the extracted meal.
4. To provide an extracted meal of high quality.
5. To provide an efficient means for and method of removing solvents from the solution.
6. To provide an oil of high quality.

Other objects of my invention will be apparent in these specifications.

My invention will now be described in further detail in connection with the accompanying drawings which are part of these specifications. In these drawings.

Figure 1:
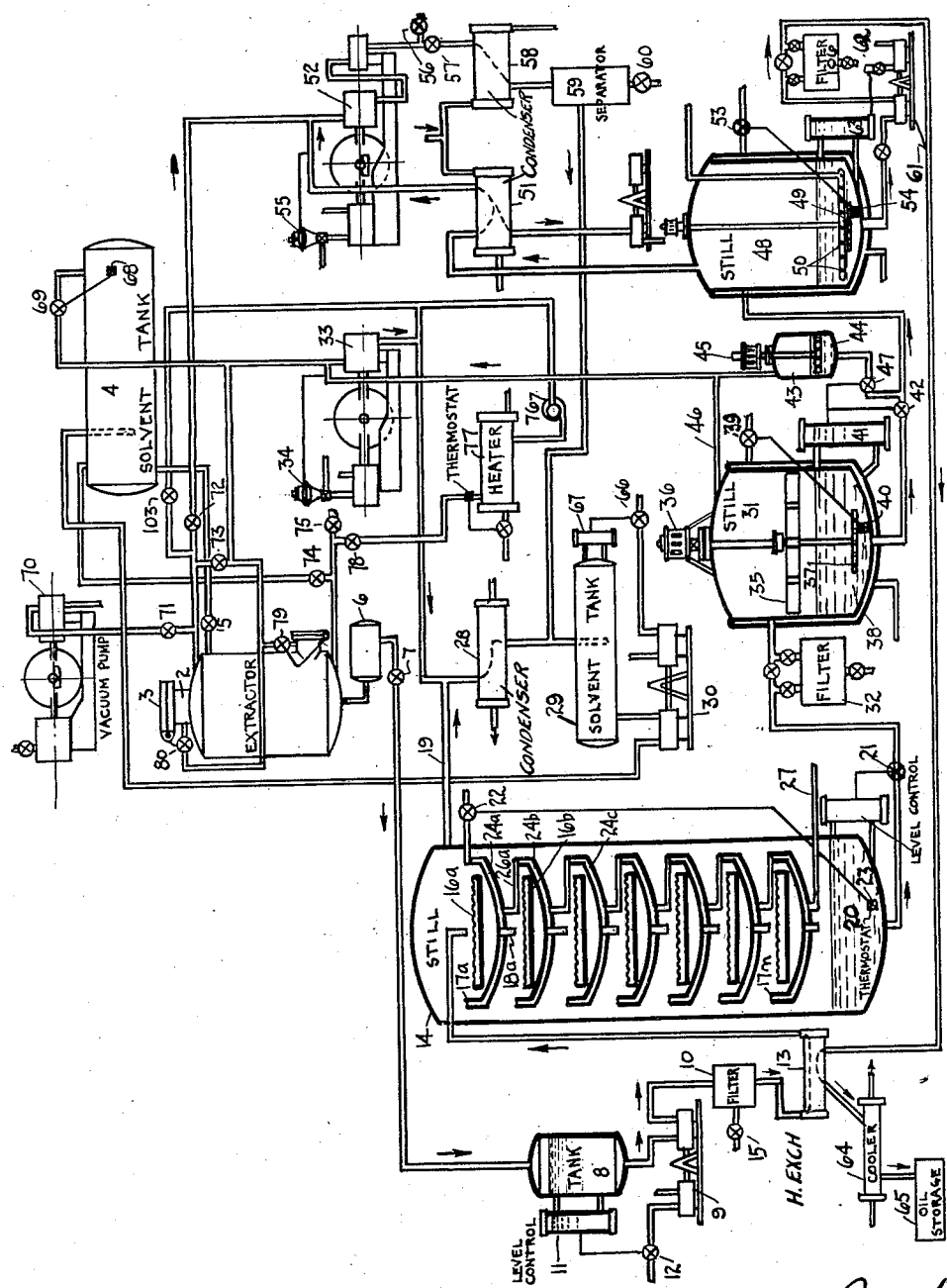
Figure 1 is a diagrammatic layout of one embodiment of my invention in which the solvent is continuously removed from the solution.

Referring to Figure 1, an extractor 1 is provided through which the solid material to be extracted is fed through the inlet neck 2 equipped with the cover 3. The solvent is contained in the storage tank 4 and is delivered to the extractor 1 through the solvent feed valve 5. The solution is withdrawn from the extractor through the float valve 6 and the discharge valve 7 and passes on to the equalizing tank 8 from which it is discharged by any suitable means, such as the pump 9, to the filter 10. The amount of solution in the equalizing tank 8 is maintained at a predetermined level by the level controller 11 operating on valve 12 which controls the source of power to the pump 9. The solution passes from the filter 10 through the heat exchanger 13 into the still 14. The filter 10 may be of any type capable of removing fine suspended particles which are not of a colloidal nature and which are not in solution in the menstruum being filtered. The precipitate from the filter 10 is discharged through valve 15.

In the heat exchanger 13, the solution is heated before it is delivered to the upper portion of still 14. Still 14 contains a plurality of heating trays with alternate distributor sections. The solution enters the upper distributing section 16a and is discharged at the circumference over the upper edge of the distributor and is delivered around the circumference of the heated tray 17a. The solution drains to the center of this tray and is discharged by the nipple 18a into the second distributor section 16b and continues in a like manner until it reaches the bottom of the still. In the passage of the solution over the heated trays the solvent is evaporated and the temperature of the solution increases as its concentration increases in its passage downward. The solution is heated only so long as it is in contact with the heated trays. Its time of contact with the heating means is therefore of short duration. Furthermore, the heating is done with the solution in thin films. This has two advantages.

1. It prevents overheating of the solution, as the thin films will tend to uniformly maintain the temperature corresponding with the pressure in the still and the concentration of the solution at the instant.

2. The use of thin film tends to limit any priming or foaming.

Priming or foaming is not to be expected in the upper portion of the still due to the relatively low concentration of solution in the upper portion of the still. Any bubbles formed in the lower portion of the still will tend to be broken up before they reach the vapor outlet 19.

The concentrated solution from the lowest heating tray 17n is discharged into a pool at the bottom of the still where it is out of contact with further heat. The level of this pool number 20 is controlled by the level control valve 21 which maintains proper level in the pool. The amount of heat delivered to the solution is controlled by the thermostatic valve 22 which admits heating medium in the upper heating tray 17a. This thermostatic valve is controlled by the thermostat 23 in the pool 20, in order to control the temperature of the distillation by the maximum temperature of the system, as explained in more detail in my application for Oil treating process, S. N. 738,399, filed coincidentally with this application. Each heating tray, in order to withstand the pressure in the still, is composed of two dished heads joined together by any suitable means, such as welding, and the heating medium is admitted to the interior space 24 of the tray. The heating medium passing through valve 22 enters the space 24a of the upper tray near the circumference and is discharged near the center of the tray through the pipe 26a to the interior space of the next lowest tray 24b and so continues down the still until it is discharged through pipe 27.

Vapor from still 14 passes through vapor outlet pipe 19 to the condenser 28 where it is condensed and is delivered to the solvent tank 29. The pressure in still 14 is controlled by the pressure in condenser 28 which in turn depends on the efficiency of the condenser, the temperature of the cooling medium and the vapor pressure of the solvent. Where butane is used as a solvent, the pressure will be in general between 15 and 50 pounds per square inch gage, while with propane as a solvent, the pressure will be in general from 50 pounds to 200 pounds per square inch gage. As the pressure of the still 14 is controlled entirely by the condenser pressure, all vapors leaving the still leave at a pressure at which they are condensable without further compression. The temperature of the solvent in the condenser 28 may be above that of storage tank 4 and extractor 1.

The solution leaving the still 14 through the level control valve 21 will have been freed from the principal amount of solvent. This solution is discharged into the still 31 after leaving still 14.

Still 31 is controlled at some predetermined pressure by means of the exhauster-compressor 33 which withdraws vapor from the still as fast as it is generated and discharges it at condenser pressure into the condenser 28. The suction of the exhauster-compressor 33 is maintained at any predetermined value by the control valve 34 which controls the supply of the power to the compressor and is actuated by the pressure in the suction line to the compressor. I prefer that the pressure in still 31 be maintained substantially at atmospheric pressure by this means.

In the extraction of certain oils, some of the mucilaginous materials are partially soluble in the solvent. Such portions as are soluble are not removed by the filter 10 and will therefore be precipitated in still 14. Where such soluble mucilaginous materials are present in sufficient amounts to be objectionable in later stages of the process, they may be removed by filter 32, after leaving still 14 while the product still contains a certain amount of solvent which will will act to lower the viscosity of the oil and thus to aid the rate of filtering. The amount of solvent in the solution leaving still 14 will be governed by the temperature of the bath 20 and this can be regulated at will up to certain maximum limitations. The amount of solvent in the solution entering filter 32 can thus be regulated to an amount where substantially all the soluble mucilaginous material will be precipitated from the solution, but the solution will still have sufficiently low viscosity for rapid filtering.

The solution entering still 31 will be concentrated to such an extent that where the oil has a tendency to prime or foam, this tendency will be at a maximum due to the fact that enough solvent has been removed to materially increase the viscosity of the solution and that there still remains sufficient solvent that its vapors will be present in sufficient amounts to form active bubbles. Still 31 is provided with the paddle 35 operated by the motor 36. Paddle 35 is placed above the liquid of still 31 and its operation will break up bubbles as they tend to rise out of the liquid. Also operated by motor 36 is a stirrer 37. This stirrer aids in removing the solvent by dislodging small bubbles of solvent vapor as they are formed. Still 31 is equipped with a heating jacket 38 into which heating medium is admitted through the thermostatic valve 39. This valve is controlled by thermostat 40, placed in the liquid within the still. The flow of liquid from the still and the level of liquid in the still is controlled by the level controller 41 operating on the valve 42. Still 31 should be of such size that the solution in passing through it is not maintained within the still and subject to the temperatures of the still for time longer than is necessary for the removal of all but a very small percentage of the solvent. A still of such size that with normal flow of solution to and from the still, the solution will be in the still for not longer than fifteen minutes to one-half hour, will generally be suitable. The solution enters the still from the top and is discharged from the bottom.

Oils, such as soy bean oil and lard, usually contain a very low content of free fatty acids and, therefore, for many uses, do not require refining with caustic. I have found that certain of these materials produce a light colored oil when extracted by my method without the use of a bleaching agent. With other materials, it is desirable to bleach the material in order to secure a product of light color. I provide means for doing this. Tank 43, equipped with the agitator 44, driven by the motor 45, may thus contain a suspension of fuller's-earth or activated carbon, preferably in some of the oil extracted in my process. Tank 43 is equalized in pressure with still 31, through pipe 46, and its flow is controlled along with the flow of liquid from the still 31 by means of the level control 41, operating on the valve 47. The liquid from tank 43, with a charge of bleaching agent, is thus mixed with the liquid discharged from still 31.

The liquid that leaves the still 31, contains small amounts of solvent. This liquid is discharged by the pressure of still 31 into the vacuum still 48. This still is equipped with a motor driven stirrer and the heating jacket in the same manner as still 31, and where necessary, may be provided with rotating paddles above the level of the liquid in the same manner as still 31. In addition, still 48 is equipped with a coil 49 having perforations 50, by means of which superheated steam may be admitted to the bath of oil at the bottom of the still. Still 48 is preferably maintained at a vacuum of from 24 to 28 inches of mercury by means of the condenser 51 and the exhauster-compressor 52. The temperature of the oil in still 48 is controlled by thermostatic valve 53 which is actuated by thermostat 54. Where open steam is used in coil 49, the temperature of the oil must be very closely controlled. The temperature of the oil must be sufficiently high to prevent condensation of steam in the oil bath on the one hand, while on the other hand the temperature must be sufficiently low to prevent deterioration of the oil. The minimum temperature will, to an appreciable extent, be governed by the vacuum maintained by condenser 51 and exhausted-compressor 52. With proper agitation of the bath, with temperature of the oil not exceeding 200° F. and a vacuum of 26 inches of mercury, a complete removal of the solvent may be obtained with only moderate use of open steam when either propane or butane is the solvent.

Condenser 51 operated at the pressure of still 43 is for the purpose of condensing the open steam added through the coil 49. The vapors of solvent containing some moisture are withdrawn from this condenser by means of the exhauster 52, which is operated to control the vacuum in the condenser at any predetermined value. This control is effected by valve 55, regulating the supply of power to the exhauster and actuated by the pressure in the suction line to the exhauster. The vapors handled by exhauster 52 may be discharged from the system through valve 56 at substantially atmospheric pressure or they may be discharged through valve 57 to condenser 58 from which the condensed solvent is delivered to the solvent tank 29 through the separator 59. Separator 59 is provided with means of separately withdrawing water that has been condensed along with the vapor in condenser 51. This water is drawn off periodically through valve 60.

The extract is removed from still 48 by means of the pump 61, the operation of which is controlled by the valve 62, actuated by the level control 63 operating upon valve 62. In this manner, a predetermined level of liquid is maintained in still 48. The oil is withdrawn from still 48 through exchanger 13, oil cooler 64 to oil storage tank 65. Where the oil discharged from still 48 is not clear and brilliant, it may be passed through filter 106 before being cooled in the heat exchanger 13 and the cooler 64.

The solvent from tank 29 is returned to the storage tank 4 by means of the pump 30. This pump maintains a predetermined level of liquid in solvent tank 29 by means of the level controller 67 operating valve 66.

The solvent in tank 4 is preferably held within a predetermined range of temperature, this range depending upon the material being extracted and the quality of the products desired. Thermostat 68, within the storage tank, controls the valve 69. When valve 69 is opened, vapors from tank 4 are admitted to exhauster 33 where they are compressed and returned to condenser 28. The solvent in tank 4 is thus cooled by evaporation.

Vacuum pump 70 discharging to the atmosphere may be placed in communication with extractor 1 by opening valve 71. Valve 72 places the extractor 1 in communication with the suction of exhauster 52; valve 73 places the extractor 1 in communication with the exhauster 33; valve 74 places the bottom of the extractor in communication with the vapor space in tank 4; valve 75 places the bottom of the extractor in communication with the atmosphere.

Blower 76, connected on its suction side with the upper portion of extractor 1, delivers solvent vapor to the heater 77, wherein they are heated to a predetermined value. Superheated vapors from the heater 77 may be delivered to the bottom of the extractor 1 by opening valve 78 from which they may be returned to the blower 76.

Figure 2:
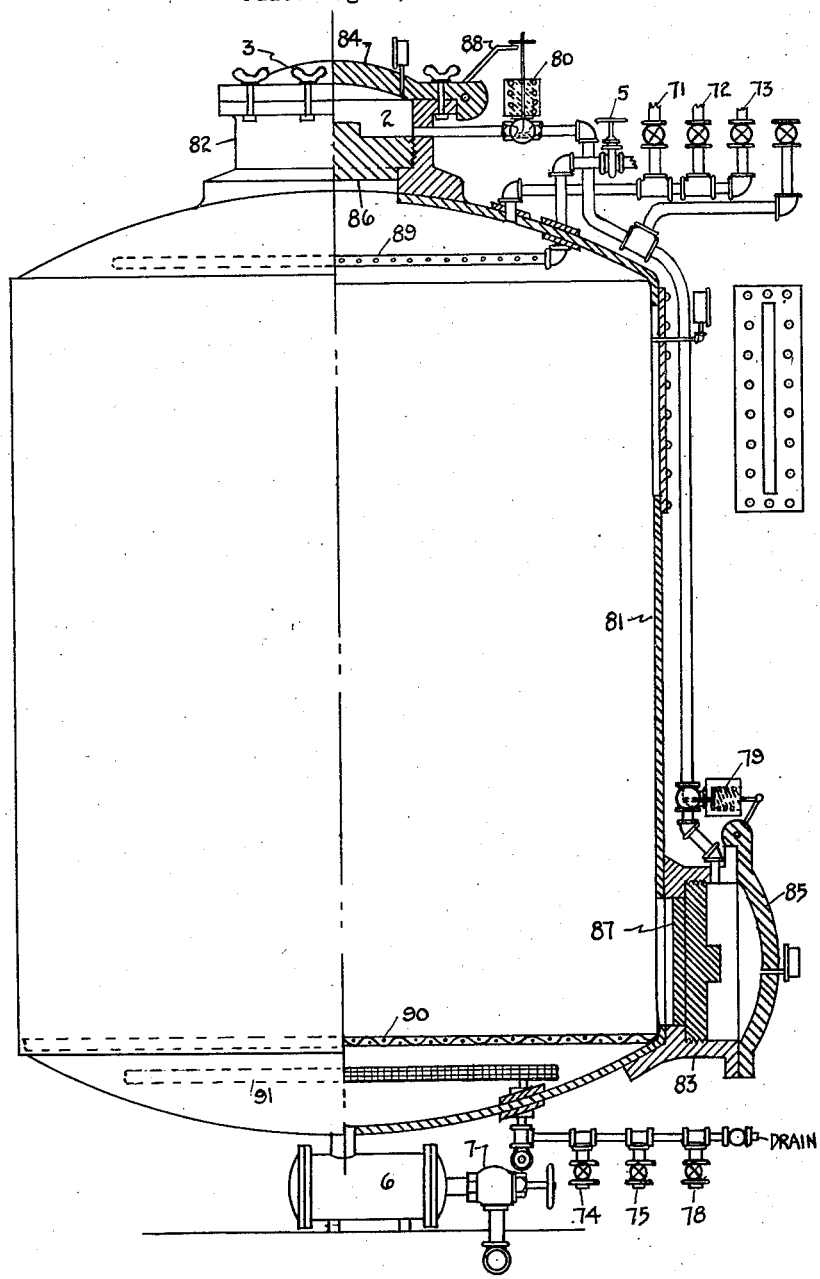
Figure 2 is an end elevation of one form of my extractor.

Now referring more specifically to Figure 2, which shows the details of the extractor; the extractor body consists of cylindrical shell 81, having an inlet opening 82 and a discharge opening 83. The former of these openings is equipped with an outer hinged cover 84 and the latter with the outer hinged cover 85. The inlet opening is equipped with the inner seal member 86 and the outlet opening is equipped with the inner sealing member 87. The space between the outer cover 84 and the inner sealing member 86 may be placed in communication with the suction of exhauster 33 by opening valve 80. In this manner any vapor which may leak past the inner sealing member is withdrawn and the space between the two covers is maintained at substantially atmospheric pressure which will aid in preventing leakage of the solvent past the outer members to the atmosphere. Valve 80 is operated by lever 88, attached to the hinged cover 84 in such a manner that when the cover is closed, valve 80 is opened, and when the cover is opened, valve 80 is closed. The space between the covers 85 and 87 is similarly connected to compressor 33 through valve 79 which is operated in a manner similar to that of valve 80.

Solvent is delivered to the extractor through valve 5 and a suitable distributor 89 in the upper portion of the extractor. Meal is retained in the extractor on permeable diaphragm 90, which is preferably composed of screen cloth or perforated material and may be covered with a layer of canvas or similar material. Below this diaphragm is a strainer 91 to which various openings at the bottom of the extractor are connected.

In operation, the extractor inlet covers are opened and the solid material is charged to the extractor. The extractor is then sealed and vacuum is applied to the top of the extractor by means of a compressor 70. The flow of air in evacuating the extractor will be upward through the bed of solid and will act to keep the bed loose and porous. Downward removal of the air would tend to compact the bed and make it impervious. When the air has been sufficiently removed from the interior of the extractor, the extractor is disconnected from the vacuum pump by closing valve 71 and the lower portion is connected to the vapor space in the solvent tank 4, through valve 74. This permits the flow of solvent vapor from tank 4 upwardly through the extractor and acts toward equalizing the pressure on the interior of the extractor with that of the solvent tank. Valve 74 is then closed and liquid solvent through valve 5 is delivered to the extractor 1. The previous evacuation described prevents air bounding within the extractor and the equalization of pressures after the evacuation prevents an inrush of liquid into the extractor which might act to compact the bed of solids in the extractor. After contacting the material within the extractor, the liquid now containing the extract is withdrawn from the extractor through valve 7 from which it passes to the equalizing tank 8 through the filter 10 into the still.

Two methods of feeding the liquid are available. After the flow of solvent has been started to the extractor, solvent may be fed continuously into the extractor and solution continuously withdrawn from the extractor until the extraction process has been completed to a sufficient degree. The alternate method is to fill the extractor with solvent allowing the solvent to stand in contact with the material to be extracted for a definite period and then to withdraw the solution from the extractor in batches, repeating this operation until the extraction has been carried to the desired amount. Where this second method is used, it is only necessary to connect the extractor with the solvent liquid after the first batch of solvent has been through the extractor, as the extractor will then be full of solvent vapors rather than air.

After the extraction is completed, the solution is drained from the extractor either for a definite period, or until no more liquid is delivered from the extractor. Superheated vapors are then delivered to the bottom of the extractor by opening previously closed valve 78. These vapors moving upwardly through the extractor bed, which will contain an amount of solvent, lose superheat in evaporating portions of this solvent. Excess solvent thus evaporated is delivered to the condenser 28 through the now opened valve 103, the balance being resuperheated and recirculated by blower 76 and heat exchanger 77 until the solvent retained on draining the meal is substantially and completely evaporated. The upward passage of the superheated vapors will tend to keep the bed in good condition, while the downward passage acts to compact the bed.

When the solvent within the extractor is substantially and completely evaporated, passage of superheated vapor to the extractor is ceased by closing valves 78 and 103, and the upper portion of the extractor is connected first to the exhauster 33 by opening valve 73, and then to the exhauster 52 by opening valve 72, after first closing valve 73. This acts to remove substantially all the solvent vapors from the extractor. When this has been accomplished, air or inert gas is admitted to the bottom of the extractor by opening valve 75. The inrush of gas from the bottom also acts to keep the extractor bed loose. When the extractor has been equalized with the atmosphere, it is ready to open up and the meal discharged.

It will be noted that the entire step of removing solvent from the meal is conducted at low temperatures, where low boiling hydrocarbons, such as propane, butane, and analogous materials are used as solvents. The effective heat applied to the meal is converted into latent heat of vaporization. The application of heat may be discontinued when the temperature of the meal and the vapors leaving the extractor act to rise appreciably above the temperature of the condenser, which should not exceed 130° F. which is below that at which the proteins which may be contained in the meal will suffer appreciable molecular rearrangements. Also during the entire solvent removal step, the meal is not in contact with air or other oxidizing material which might act to oxidize the proteins during this gentle heating process.

Figure 3:
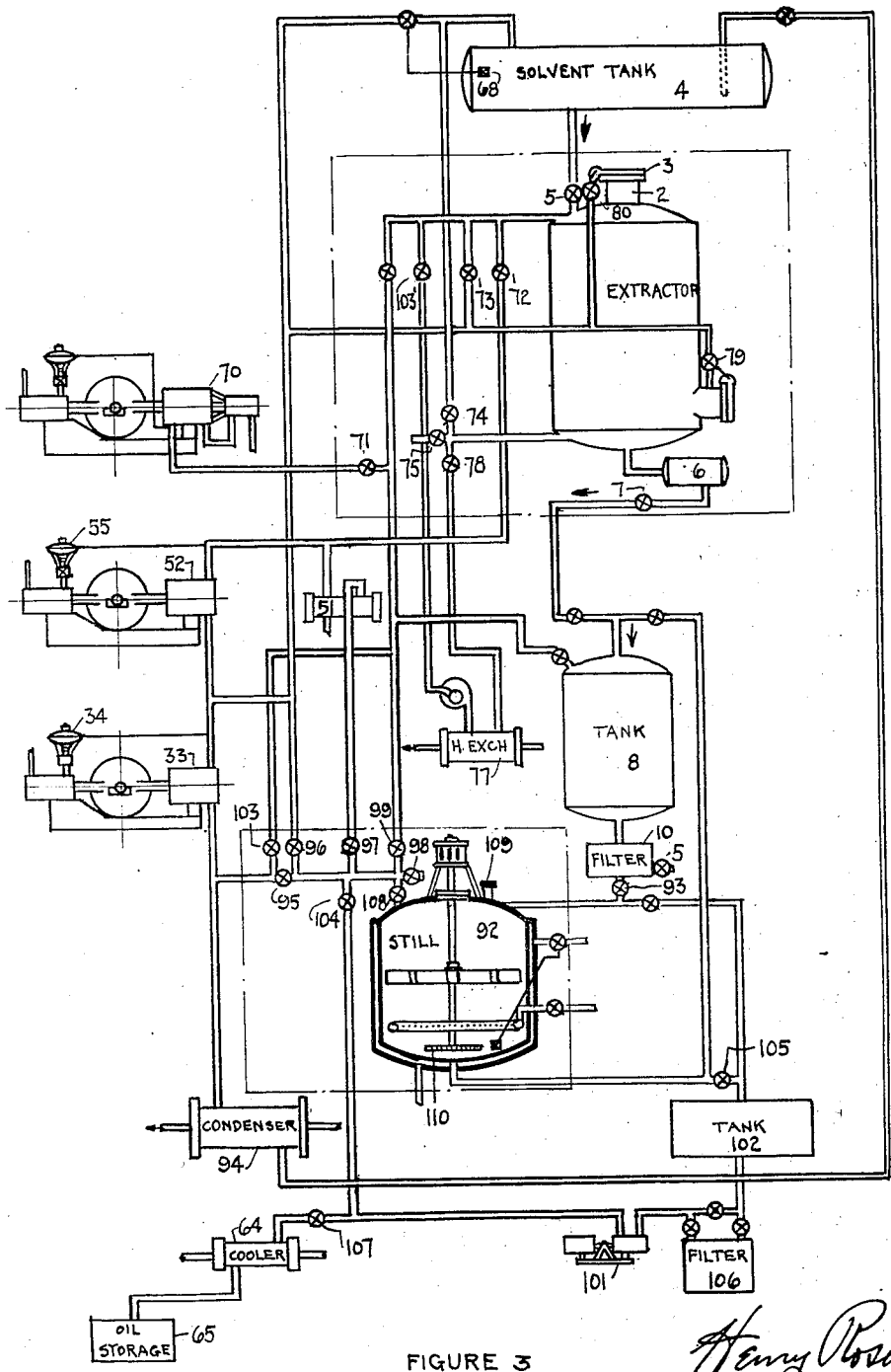
Figure 3 is a diagrammatic layout of a further embodiment of my invention in which the solvent is removed from the solution in batches.

Now referring to Figure 3, the still 92, which is of similar construction to still 48, replaces still 14, 31 and 48. Still 92 may be connected to receive solution from the extractor by opening valve 93. Condenser 94 replaces condensers 28 and 58 of Figure 1. Still 92 may be connected with condenser 94 by opening valve 95, or it may be connected with exhauster 33 by opening valve 96, and exhauster 52 by opening valve 97. Valve 98 connects still 92 with the atmosphere, and valve 99 connects still 92 with the vacuum pump 70. Filter 106 replaces filter 32 and 106 of Figure 1, and pump 101 performs the same function as pump 61 of Figure 1, but it may also return material to the still 92.

The solution from the extractor is immediately filtered upon leaving the extractor. As shown in Figure 1, the solvent is removed from the solution in a continuous manner, first, at a pressure sufficient to permit condensation of the solvent vapors without compression. The solution is then further stripped of solvent at lower pressure stages. Continuous stripping of the solvent requires the use of a plurality of stills. As shown in Figure 3, batch stripping is utilized. With this modification, a single still may alternately perform the function of two or more stills which are required for continuous stripping. Where a batch still is used, as shown in Figure 3, before admitting solution to the still, it is preferable that the still be first evacuated by connecting the still to a vacuum, and that the vacuum then be broken by admitting solvent vapors into the still before admitting a batch of solution.

With this modification, the operation of the extractor proper is substantially the same as that described in connection with Figure 1, but tank 8 into which the solution is discharged from the extractor is preferably of sufficient size to hold a full batch of solution from the extractor. This solution is delivered to still 92 through filter 10 by opening valve 93. Valve 93 is then closed and the still 92 is placed in communication with condenser 94 by opening valve 95. Still 92 with this connection acts to perform the same function as still 14 of Figure 1. When this operation has been substantially completed, valve 95 is closed and valve 96 is opened, whereby still 92 is placed in communication with exhauster 33. Under this connection, still 92 will perform substantially the same functions as still 31 of Figure 1. On the substantial completion of this operation, valve 96 is closed and valve 97 is opened, whereby still 92 is placed in communication with condenser 51 and compressor 52 which perform the same function as in Figure 1. With this connection, still 92 operates in substantially the same manner as still 48 of Figure 1.

The finished oil from still 92 is withdrawn by any suitable means, such as the pump 101, through the valve 105 and 107, the oil cooler 64 to the oil storage tank 65. Where the oil leaving the still 92 is not clear and brilliant, it may be passed through filter 106.

Filter 106 may, moreover, be used at any stage of the vaporizing process. Thus, by opening valve 105, the solution may at any time be completely withdrawn from still 92 to tank 102 and the filter 106, and it may then be returned to the still by pump 101 through valve 104. The opening 109 sealed by any suitable means is provided for introducing a filter-aid into the still 92 prior to withdrawing the solution for filtering. Filter-aid thus introduced into the still will be properly distributed into the liquid within the still by the operation of the agitator 110.

In the preceding, I have described the details of an oil extraction and separation system. It will be obvious that numerous products may be treated in my system for extracting oils, and that numerous oils in solution may be separated in accordance with my invention, the physical conditions being varied in accordance with the product being treated.

In my copending applications filed of even date relating to Methods and products of cotton seed extraction, S. N. 738,402; Method and products of extracting animal oil, S. N. 738,403; and Coffee and the treatment thereof, S. N. 738,404, I have disclosed certain specific applications of my invention although it will be understood that it may equally well be applied to the numerous other extracted oils.

Thus it will be understood that the invention may be applied to extraction of many products, and that the refining of oils generally may be carried on in accordance with the principles of my invention, and I do not intend to limit myself except as set forth in the appended claims.

I claim:

1. In an extraction system, an extractor comprising a vertical cylindrical shell for maintaining pressures substantially different than atmospheric, said shell being provided with an inner and an outer sealing member, means in communication with the space between said inner and outer sealing member for maintaining the pressure within said space substantially at atmospheric.

2. In an extraction system, an extractor comprising a vertical cylindrical shell for maintaining pressures substantially different than atmospheric, said shell being provided with an opening sealed with an inner and outer sealing member, means in communication with the space between said inner and outer sealing member for maintaining the pressure within said space substantially at atmospheric, and control means functionally connected with said outer sealing member for controlling the operation of said first means.

3. In an extraction system, an extractor comprising a vertical cylindrical shell for maintaining pressures substantially different than atmospheric, said shell being provided with an opening having a screwed inner sealing member and a hinged outer sealing member, a pipe line with a valve in communication with the space between the inner and outer sealing member, and means functionally connecting said hinged outer sealing member and said valve.

4. The method of extraction which comprises subjecting a solid material to the action of a liquid solvent in a closed extractor under pressure, withdrawing the solution from the extractor and draining the solution from the extracted solid, subsequently forcing a circulation of superheated solvent vapors under pressure from below the bed of said extracted solid and removing vapors from above the bed of said extracted material, superheating a portion of the vapors so removed and returning said portion to the bed of extracted solid while condensing the excess vapors so generated, subsequently placing said extractor under vacuum, then removing said extracted solid from the extractor, and separately removing the solvent from the solution.

5. In a system of extraction, the step of removing solvent from the spent meal in stages, which comprises first draining the solution from spent meal, then subjecting said spent meal to the action of superheated solvent vapors until the residual solvent from the draining operation is substantially completely vaporized by removing vapors from said spent meal, superheating a portion of said vapors and introducing said portion to said spent meal, and finally subjecting the spent meal to a vacuum whereby the solvent vapors retained at the completion of the second stage are substantially completely removed.

6. In a process of extraction of glyceride oils, the steps of contacting a material to be extracted with a liquid solvent, withdrawing the solution from the extracted residue, filtering the solution, removing a substantial amount of solvent from the solution by the application of heat, and refiltering the resulting liquid while it is still hot from the solvent removal step, and then removing a further amount of solvent.

7. In a process of extraction, the steps of obtaining a solution of a solute in a solvent partially removing solvent from the solution, filtering the solution, adding a solid bleaching agent to said solution, substantially completely removing the remaining solvent by the application of heat with the solution subject to the action of said bleaching agent, and finally substantially removing said bleaching agent from the bleached product.

8. In a process of extraction of glyceride oils, the steps of obtaining a solution of a solute in a solvent, withdrawing the solution from the residue, filtering the solution withdrawn from the residue, then removing a substantial portion of the solvent from the solution, then refiltering the solution, and then removing a further amount of solvent.

9. The method of extracting oleaginous materials which comprises subjecting the material to a hydrocarbon solvent, gaseous at ordinary temperature and pressure, maintaining the solvent in the liquid phase while in contact with the material to be extracted, withdrawing the solution at substantially the pressure of the dissolving step, increasing the pressure on the solution by a substantial amount, and substantially completely separating the solvent from the extract by vaporization in a plurality of pressure stages, the initial stage being at superatmospheric pressure while maintaining the temperature of the solution and the extract in each pressure stage below a predetermined value, of the order of 210° F., the final pressure stage being maintained under a high vacuum.

10. In a process of extraction, an extraction step in which the extraction is carried on at superatmospheric pressure and a solvent removal step comprising; vaporizing the solvent in a plurality of stages; maintaining a pressure in the first stage at superatmospheric pressure in excess of the pressure of the extraction step controlled solely by the condensation of the vapors released in said stage; operating each succeeding stage at successively lower pressure with the last stage at a relatively high vacuum; applying heat to the solution in each stage; controlling the application of heat in each stage in accordance with the temperature of the solution discharged from that stage.

11. In a process of extraction of oleaginous material with a solvent gaseous at ordinary temperature and pressure, and applied in the liquid phase while in contact with said oleaginous material, an extraction step and the continuous removal of solvent from the extract in a plurality of pressure stages, the pressure in the first stage being maintained at a point at which the solvent vapors are condensed under the operating condensation temperature in said stage, the condensation temperature and pressure being in excess of the extraction temperature and pressure.

12. In a process of extraction of oleaginous material with a solvent gaseous at ordinary temperature and pressure, and applied in the liquid phase while in contact with said oleaginous material, an extraction step and the continuous removal of solvent from the extract in a plurality of pressure stages, the pressure in the first stage being maintained at a point at which the solvent vapors are condensed under the operating condensation temperature in said stage, the condensation temperature and pressure being in excess of the extraction temperature and pressure; the pressure after the first stage being reduced by mechanical eduction of the vapors to effect the substantially complete removal of the solvent from the extract; the removal of the solvent being effected by the application of heat maintained below a predetermined temperature in response to the temperature of the liquid effluent from each stage.

13. The method of extracting oleaginous materials which comprises subjecting the material to a hydrocarbon solvent, gaseous at ordinary temperature and pressure; maintaining the solvent in the liquid phase while in contact with the material to be extracted; withdrawing the solution at substantially the pressure of the dissolving step, and substantially completely separating the solvent from the extract by vaporization in a plurality of pressure stages while maintaining the temperature of the solution and the extract in each pressure stage below a predetermined value of the order of 210° F., the final pressure stage being maintained under a high vacuum, and the initial pressure stage being maintained under a super-atmospheric pressure in excess of that corresponding to the vapor pressure of the solvent at the temperature of the extraction step.

14. In a process of extraction, the steps of obtaining a solution of a solute in a solvent, partially removing solvent from the solution by application of heat, filtering the solution, adding a solid bleaching agent to said solution while said solution still retains an appreciable portion of the sensible heat added to said solution in said solvent removal step; substantially completely removing the remaining solvent by the application of further heat with the solution subject to the action of said bleaching agent, and finally substantially removing said bleaching agent, from the bleached product.

15. In the process of extraction of oleaginous materials with propane applied to the oleaginous material while in the liquid phase, the removal of solvent from the extract in a plurality of pressure stages, the solvent being removed as a vapor and the extract being separately removed as a liquid effluent, the pressure in the first stage being maintained at a point at which the solvent vapors are condensed under the operating condensation temperature in said stage, and the pressure after the first stage being reduced by mechanical extraction of the vapors to effect the substantially complete removal of the solvent from the extract, the removal of the solvent being effected by the application of heat maintained below a predetermined temperature in response to the temperature of liquid effluent from each stage.

HENRY ROSENTHAL.